(12) United States Patent
Ikeda

(10) Patent No.: US 9,789,531 B2
(45) Date of Patent: Oct. 17, 2017

(54) FASTENER APPLYING APPARATUS AND FASTENER APPLYING METHOD

(71) Applicant: MITSUBISHI HEAVY INDUSTRIES, LTD., Tokyo (JP)

(72) Inventor: Yusuke Ikeda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 224 days.

(21) Appl. No.: 14/437,725

(22) PCT Filed: Oct. 28, 2013

(86) PCT No.: PCT/JP2013/079156
§ 371 (c)(1),
(2) Date: Apr. 22, 2015

(87) PCT Pub. No.: WO2014/069411
PCT Pub. Date: May 8, 2014

(65) Prior Publication Data
US 2015/0273570 A1   Oct. 1, 2015

(30) Foreign Application Priority Data

Nov. 1, 2012   (JP) .................................. 2012-242235

(51) Int. Cl.
*B21J 15/32*   (2006.01)
*B21J 15/04*   (2006.01)
(Continued)

(52) U.S. Cl.
CPC ............... *B21J 15/32* (2013.01); *B21J 15/04* (2013.01); *B21J 15/142* (2013.01); *B21J 15/147* (2013.01);
(Continued)

(58) Field of Classification Search
CPC ......... Y10T 29/49947; Y10T 29/53057; Y10T 29/53065; Y10T 29/53091;
(Continued)

(56) References Cited

U.S. PATENT DOCUMENTS 4,662,556 A * 5/1987 Gidlund .................. B21J 15/10
227/111
4,747,294 A * 5/1988 Schwartz ................. B21J 15/32
227/112

(Continued)

FOREIGN PATENT DOCUMENTS

JP   1981-29700 U   3/1981
JP   S60-127930 A   7/1985
(Continued)

OTHER PUBLICATIONS

PCT/IB/338, "Notification of Transmittal of Translation of the International Preliminary Report on Patentability for International Application No. PCT/JP2013/079156," dated May 14, 2015.
(Continued)

*Primary Examiner* — Jacob Cigna
(74) *Attorney, Agent, or Firm* — Manabu Kanesaka; Benjamin Hauptman; Kenneth Berner

(57) ABSTRACT

A fastener applying apparatus includes: an insertion mechanism for inserting a fastener into a fastener hole in an object to be fastened; a support mechanism for supporting the insertion mechanism; and a fastener conveying device for conveying the fastener to the insertion mechanism. The insertion mechanism includes a holding portion for holding a shank portion of the fastener. The fastener conveying device includes a gripping portion for gripping the fastener in a axial direction of the fastener.

8 Claims, 15 Drawing Sheets

(51) Int. Cl.
*B21J 15/14* (2006.01)
*B21J 15/28* (2006.01)
*B29L 31/30* (2006.01)
*B29C 65/56* (2006.01)
*B29C 65/78* (2006.01)
*B29C 65/00* (2006.01)

(52) U.S. Cl.
CPC ............ *B21J 15/28* (2013.01); *B29C 65/562* (2013.01); *B29C 65/7876* (2013.01); *B29C 66/02241* (2013.01); *B29C 66/1122* (2013.01); *B29C 66/21* (2013.01); *B29C 66/41* (2013.01); *B29C 66/721* (2013.01); *B29C 66/8322* (2013.01); *B29C 66/861* (2013.01); *B29C 66/86533* (2013.01); *B29C 66/92311* (2013.01); *B29L 2031/3076* (2013.01); *Y10T 29/49947* (2015.01); *Y10T 29/53057* (2015.01); *Y10T 29/53065* (2015.01); *Y10T 29/53091* (2015.01); *Y10T 29/53717* (2015.01)

(58) Field of Classification Search
CPC ............ Y10T 29/53717; Y10T 66/861; Y10T 66/8322; B29L 2031/3076
See application file for complete search history.

(56) References Cited

U.S. PATENT DOCUMENTS

| | | | | |
|---|---|---|---|---|
| 5,236,341 | A * | 8/1993 | Stafford | B21J 15/32 221/200 |
| 5,375,754 | A * | 12/1994 | Botha | B21J 15/142 227/114 |
| 2006/0218780 | A1 * | 10/2006 | Lewis | B21J 15/10 29/798 |
| 2010/0163595 | A1 * | 7/2010 | Draht | B21J 15/32 227/120 |
| 2010/0180424 | A1 | 7/2010 | Le Vacon | |

FOREIGN PATENT DOCUMENTS

| | | |
|---|---|---|
| JP | H05-242 U | 1/1993 |
| JP | H08-309475 A | 11/1996 |
| JP | H09-153676 A | 6/1997 |
| JP | 2000-135541 A | 5/2000 |
| JP | 2002-28745 A | 1/2002 |
| JP | 2004-306115 A | 11/2004 |
| JP | 2010-532266 A | 10/2010 |

OTHER PUBLICATIONS

PCT/IB/373, "International Preliminary Report on Patentability for International Application No. PCT/JP2013/079156," dated May 5, 2015.
PCT/ISA/237, "Written Opinion of the International Searching Authority for International Application No. PCT/JP2013/079156," dated Feb. 4, 2014.
PCT/IB/326, "Notification Concerning Transmittal of International Preliminary Report on Patentability for International Application No. PCT/JP2013/079156," dated May 14, 2015.
PCT/ISA/210, "International Search Report for PCT/JP2013/079156", dated Oct. 28, 2013.

* cited by examiner

FASTENER APPLYING APPARATUS AND FASTENER APPLYING METHOD

RELATED APPLICATIONS

The present application is National Phase of International Application No. PCT/JP2013/079156 filed Oct. 28, 2013, and claims priority from Japanese Application No. 2012-242235, filed Nov. 1, 2012, the disclosure of which is hereby incorporated by reference herein in its entirety.

TECHNICAL FIELD

The present invention relates to a technique of fastening an object to be fastened using a fastener (a fastening component) such as bolt and rivet.

BACKGROUND ART

A technique of fastening an object to be fastened using a fastener (a fastening component) such as bolt and rivet is used for assembling an aircraft etc. A rivet applying apparatus for fastening the object to be fastened using the rivet is known.

An automatic riveting device disclosed in Patent Literature 1 includes a riveter main body having a mechanism to drive the rivet to a workpiece. The riveter main body has a C-shape to sandwich the workpiece in the vertical direction. An upper head portion is provided at an end of the upper side of the riveter main body. A die is provided at an end of the lower side of the riveter main body.

FIG. 1 is for indicating above mentioned upper head portion 351. The upper head portion 351 is movable in directions indicated by the arrows using a hydraulic cylinder 352. A vertically movable drill spindle 353, a vertically movable rivet caulking jig 354 and a vertically movable shaving cutter 355 are arranged along a straight line parallel to the direction indicated by the arrows at the lower surface of the upper head portion 351, which is the position facing the upper surface of the workpiece 304. A drill 356 is mounted on the drill spindle 353. After the workpiece 304 is set, the drill spindle 353 is lowered to form a rivet hole 304a in the workpiece 304. Then, the hydraulic cylinder 352 moves the rivet caulking jig 354 to the position where the drill spindle 353 was located so far. Next, the rivet caulking jig 354 is lowered while holding the rivet R to insert the shank portion of the rivet R into the rivet hole 304a. Further, the rivet R is pressed by both the die formed on the lower side end of the riveter main body and the rivet caulking jig 354. As a result, the driving the rivet R has been completed. Note that the shaving cutter 355 is used for removing the head of the rivet R.

Patent Literature 2 and Patent Literature 3 disclose other riveting devices.

In recent years, cases in which component made of composite material such as fiber reinforced plastic in place of component made of metal is used are increasing. For example, a lot of composite material components have come to be used for the aircraft.

Referring to FIGS. 2 to 7, a method of manually fastening the composite material component to be fastened will be explained.

As shown in FIG. 2, the workpiece 100 as the object to be fastened includes a plurality of composite components 51 and 52 in a stacked state. A hole 100a with a countersink which penetrates from one side of the workpiece surface 100b to the other side of the work piece surface 100c is formed. The countersink portion of the hole 100a is disposed on the surface 100b side. The workpiece 100 has a countersink wall 100d surrounding the countersink portion of the hole 100a. After the hole 100a with the countersink is formed, the workpiece 100 is cleaned and burrs generated during the formation of the hole 100a with the countersink are removed.

FIG. 3 is for indicating a fastener 25 as a fastening component for fastening the workpiece 100. The fastener 25 includes a flat head bolt 20 and a sleeve 40. The flat head bolt 20 includes a head portion 21, a cylindrical portion 22, and a threaded portion 23. The head portion 21 has a head upper surface 21a and a head side surface 21b. The head side surface 21b is formed in a conical surface. The cylindrical portion 22 is disposed between the head portion 21 and the threaded portion 23. The cylindrical portion 22 is not formed threads. The threaded portion 23 has an end surface 23a. The head upper surface 21a and the end surface 23a are arranged at both ends in the axial direction of the fastener 25. The sleeve 40 is placed to cover the cylindrical portion 22. A portion of the cylindrical portion 22 close to the head portion 21 is exposed from the sleeve 40. The sleeve 40 includes a flat portion 41 disposed on the head portion 21 side and a cylindrical portion 42 disposed on the threaded portion 23 side. The flat portion 41 is formed in a conical shape.

As shown in FIG. 4, the fastener 25 is inserted into the hole 100a with the countersink until the flat portion 41 comes in contact with the countersink wall 100d. In a state that the flat portion 41 is in contact with the countersink wall 100d, the head portion 21 protrudes from the surface 100b and the threaded portion 23 protrudes from the surface 100c.

As shown in FIG. 5, the fastener 25 is driven by repeatedly applying impact force to the head upper surface 21a using an air hammer 200.

As shown in FIG. 6, the impact force is repeatedly applied until the fastener 25 is seated on the workpiece 100. That is, the impact force is repeatedly applied until the head portion 21 comes in contact with the countersink wall 100d via the flat portion 41.

As shown in FIG. 7, the composite material component 51 and the composite material component 52 are fastened by mounting a nut 30 on the threaded portion 23.

CITATION LIST

Patent Literature

Patent Literature 1: Japanese Patent Application Publication JP2000-135541A

Patent Literature 2: Japanese Patent Application Publication JP2002-28745A

Patent Literature 3: Japanese Utility Model Application Publication JP H05-000242U

SUMMARY OF THE INVENTION

A fastener applying apparatus according to the present invention includes: an insertion mechanism for inserting a fastener into a fastener hole in an object to be fastened; a support mechanism for supporting the insertion mechanism; and a fastener conveying device for conveying the fastener to the insertion mechanism. The insertion mechanism includes a holding portion for holding a shank portion of the fastener. The fastener conveying device includes a gripping portion for gripping the fastener in a axial direction of the fastener.

DESCRIPTION OF EMBODIMENTS

Referring to the attached diagrams, some embodiments of the present invention will be explained.

First Embodiment

Figure 8:
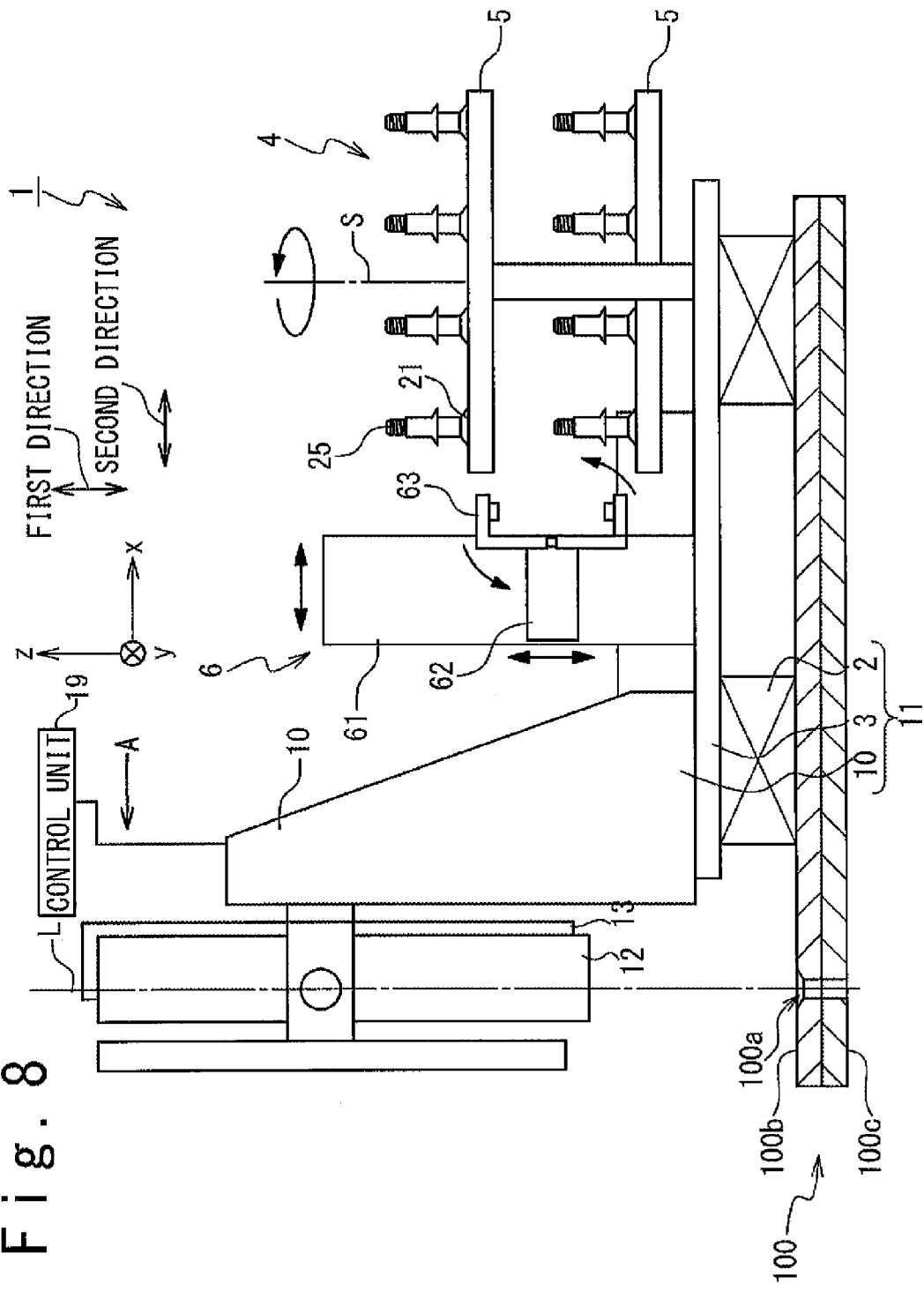
FIG. 8 is a schematic diagram for indicating a fastener applying apparatus according to the first embodiment.

FIG. 8 is the schematic diagram for indicating the fastener applying apparatus 1 according to the present embodiment. In FIG. 8, X-axis, Y-axis and Z-axis which are perpendicular to each other are defined. Z-axis is a vertical axis or substantially a vertical axis. Note that a direction parallel to the Z-axis is defined as a first direction, and a direction perpendicular to the first direction is defined as a second direction.

The fastener applying apparatus 1 according to the present embodiment has a function of inserting the fastener 25 to the workpiece 100 and driving the fastener. The workpiece 100 has a surface 100b and a surface 100c. In the workpiece 100, a hole 100a with a countersink penetrating from the surface 100b to the surface 100c is formed. An axial direction of the hole 100a with the countersink is parallel to the Z-axis, and corresponding to the vertical direction or substantially vertical direction. The fastener applying apparatus 1 is configured to insert the fastener into the hole 100a with the countersink and drive the fastener.

The fastener applying apparatus 1 includes a control unit 19, a support mechanism 11, a cartridge 4, a fastener conveying device 6, an insertion mechanism 12, and an impact force applying mechanism 13.

The control unit 19 is realized by, for example, a computer, and has a function of controlling an operation of the fastener applying apparatus 1.

The support mechanism 11 is provided for supporting the cartridge 4, the fastener conveying device 6, the insertion mechanism 12 and the impact force applying mechanism 13. The support mechanism 11 includes a vacuum rail 2 (moving mechanism), a base 3, and a frame 10. The vacuum rail 2 is placed on the workpiece 100. The base 3 is disposed on the vacuum rail 2, and movable on the vacuum rail 2 along the second direction. The frame 10 is provided to support the insertion mechanism 12 and the impact force applying mechanism 13, and is disposed on the base 3. The insertion mechanism 12 and the impact force applying mechanism 13 are also movable along the second direction in accordance with the movement of the base 3 on the vacuum rail 2.

The cartridge 4 has a function of storing a plurality of the fasteners 25. The cartridge 4 is placed on the base 3.

The fastener conveying device 6 has a function of conveying the fastener 25 from the cartridge 4 to the insertion mechanism 12. The fastener conveying device 6 is placed on the base 3.

As described above, the insertion mechanism 12 and the impact force applying mechanism 13 are supported by the frame 10. The insertion mechanism 12 has a function of inserting the fastener 25 into the hole 100a with the countersink. The impact force applying mechanism 13 has a function of driving the fastener by applying the impact force to the inserted fastener 25.

Figure 9:
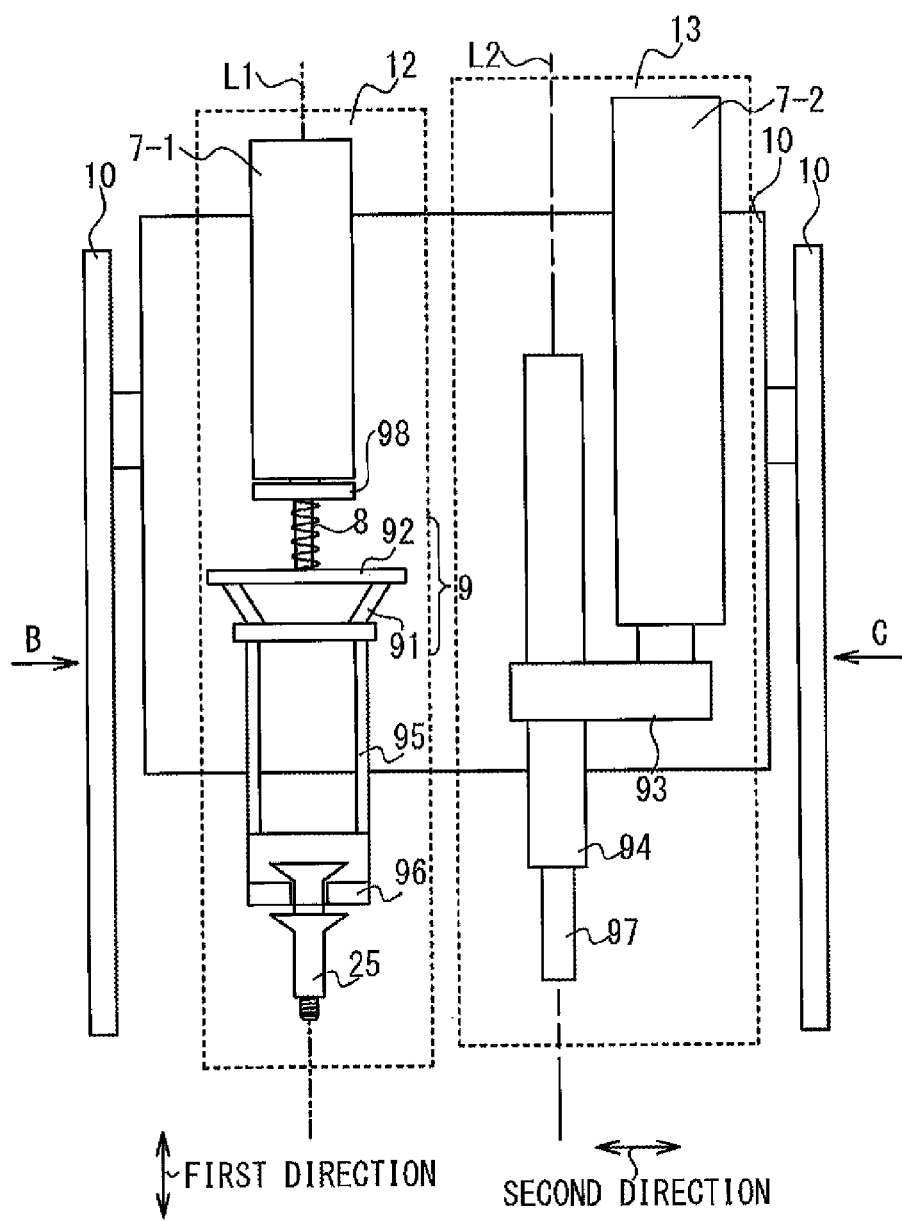
FIG. 9 is a diagram for indicating an insertion mechanism and an impact force applying mechanism.

Note that, according to the present embodiment, the arrangement of the insertion mechanism 12 and the impact force applying mechanism 13 are devised. FIG. 9 is the diagram for indicating the insertion mechanism 12 and the impact force applying mechanism 13. FIG. 9 is the diagram when the insertion mechanism 12 and the impact force applying mechanism 13 are viewed from the direction A shown in FIG. 8. As shown in FIG. 9, the insertion mechanism 12 and the impact force applying mechanism 13 are supported by the frame 10 so as to be along different axes, respectively. Specifically, the insertion mechanism 12 has a function to move fasteners 25 (up or down) along the insertion axis L1 which is along the first direction. On the other hand, the impact force applying mechanism 13 has a snap 97 (an end effector), and is configured to apply the impact force to the inserted fastener 25 by moving the snap 97 along a driving axis L2 which is along the first direction. The insertion axis L1 and the driving axis L2 are different axes from each other.

Since the insertion mechanism 12 and the impact force applying mechanism 13 are disposed along the different axes, weight of the insertion mechanism is eliminated from the impact force applying mechanism. Therefore, the vibration etc. generated at the time of applying the impact force can be reduced and the stability is improved as compared to the apparatus whose insertion mechanism and impact force applying mechanism are disposed on the same axis. As a consequence, it is possible to reduce the weight of the whole apparatus.

The fastener applying apparatus 1 will be explained in detail below.

Firstly, the cartridge 4 will be explained in detail. As shown in FIG. 8, the cartridge 4 has a plurality of the shelf plates 5. The plurality of shelf plates 5 is arranged at different heights. On each shelf plate 5, each of the plurality of fasteners 25 is arranged in a standing attitude such that the head portion 21 orients toward a lower side. The plurality of shelf plates 5 is rotatable about a rotation axis S parallel to the Z-axis.

Figure 10:
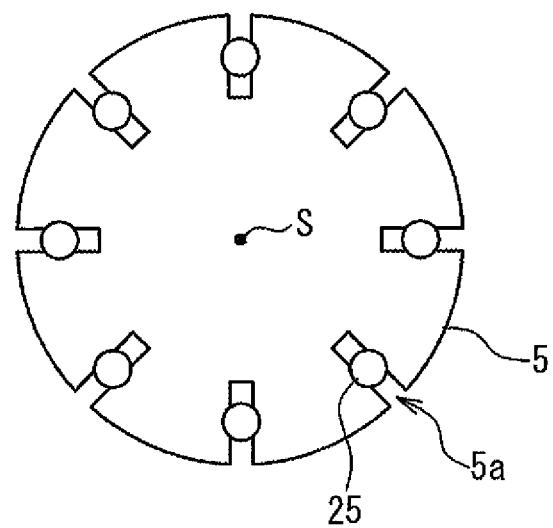
FIG. 10 is a plan view for indicating a shelf plate.

FIG. 10 is a plan view for indicating the shelf plate 5. The shelf plate 5 is formed in a circular shape. The rotation axis S is through the center of the shelf plate 5. A plurality of notches 5a is formed in the shelf plate such that each of the notches extends toward the center from the periphery. The plurality of notches 5a is arranged radially around the center of the shelf plate 5. The fastener 25 is placed over the notch 5a. Note that in case that the shelf plate 5 does not rotate, the shelf plate 5 may not be in a circular shape.

Next, the fastener conveying device 6 will be explained in detail. As shown in FIG. 8, the fastener conveying device 6 includes a main body portion 61, a lifting portion 62, and a gripping portion 63. The main portion 61 is movable on the base 3 along the second direction. The lifting portion 62 is supported by the main body portion 61, and is vertically movable (movable in a direction parallel to the Z-axis). The gripping portion 63 is supported by the lifting portion 62. The gripping portion 63 is supported by the lifting portion 62 so as to be rotatable about a rotation axis perpendicular to the Z-axis.

Figure 11:
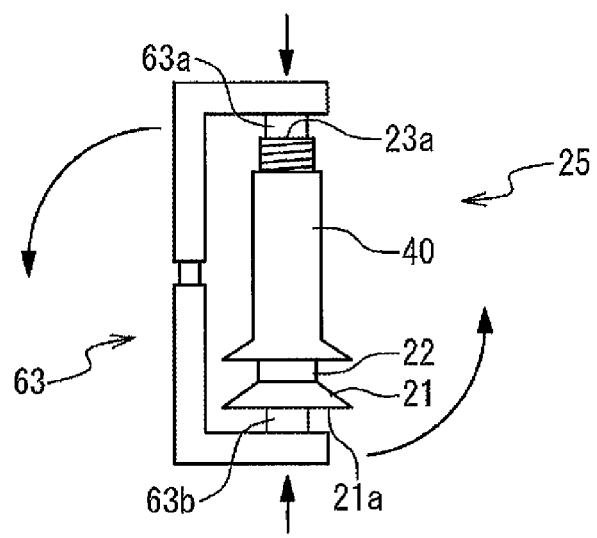
FIG. 11 is a diagram for indicating a gripping portion.

FIG. 11 is a diagram for indicating the gripping portion 63. As shown in FIG. 11, the gripping portion 63 includes a first gripping portion 63a and a second gripping portion 63b. The gripping portion 63 grips the fastener 25 by contacting the first gripping portion 63a to the end surface 23a and contacting the second gripping portion 63b to the head upper surface 21a. The distance between the first gripping portion 63a and the second gripping portion 63b is adjustable.

Figure 12:
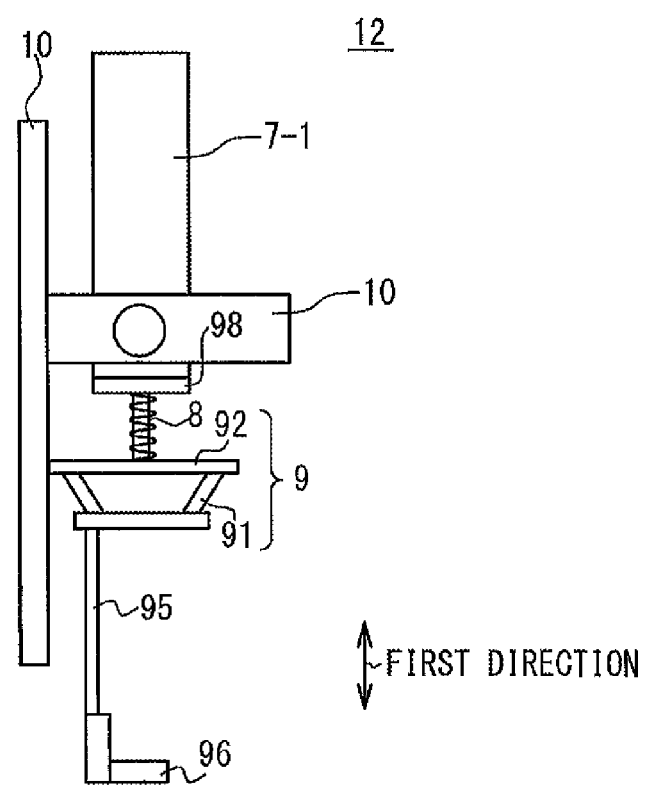
FIG. 12 is a side view for indicating the insertion mechanism.

Subsequently, referring to FIGS. 9 and 12, the insertion mechanism 12 will be explained in detail. FIG. 12 is the side view for indicating the insertion mechanism 12. FIG. 12 is the diagram when the insertion mechanism 12 is viewed from the direction B indicated in FIG. 9. As shown in FIGS. 9 and 12, the insertion mechanism 12 includes a feeding device 7-1, a first elastic member 8, an alignment unit 9, and a chuck 95.

The feeding device 7-1 is supported by the frame 10. The feeding device 7-1 has a base portion 98, and has a function of moving the base portion 98 along the first direction. As the feeding device 7-1, for example, a cylinder device is used.

The first elastic member 8 is supported by the base portion 98 at the upper end, and supports the alignment unit 9 at the lower end.

Figure 13:
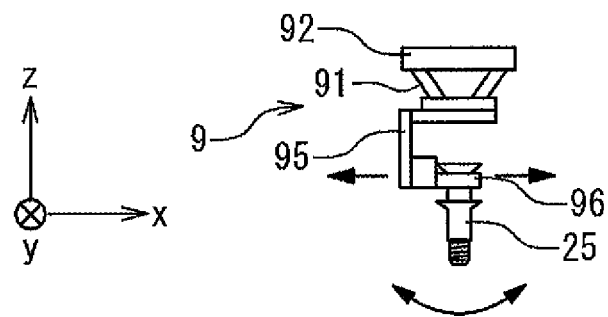
FIG. 13 is a diagram for indicating an alignment unit.

The alignment unit 9 includes a movable body 92 and a plurality of second elastic members 91. The movable body 92 is supported by the first elastic member 8. FIG. 13 is the diagram for indicating the alignment unit 9. As shown in FIG. 13, the plurality of second elastic members 91 is arranged along a plane between the movable body 92 and the chuck 95. The plurality of second elastic member 91 supports the chuck 95 such that the chuck 95 is movable along a plane perpendicular to the Z-axis. Then, the plurality of second elastic member 91 supports the chuck 95 such that the chuck 95 is swingable about an oscillation axis perpendicular to the Z-axis. For example, the plurality of second elastic members 91 supports the chuck 95 such that the chuck 95 is movable in a direction parallel to the X-axis and in a direction parallel to the Y-axis as well as the chuck 95 is swingable about the oscillation axis parallel to the X-axis and is swingable about the oscillation axis parallel to the Y-axis, respectively.

The chuck 95 is a portion for supporting the fastener 25. As shown in FIGS. 9 and 12, a holding portion 96 is arranged at the lower end portion of the chuck 95. The holding portion 96 is capable of opening and closing, and has a function of holding (sandwiching) the shank portion (for example, the cylindrical portion 22) of the fastener 25. The fastener 25 can be removed from the chuck 95 by opening the holding portion 65.

According to the above-mentioned insertion mechanism 12, the feeding device 7-1 lowers the base portion 98. Thereby, the fastener 25 which is held by the holding portion 96 is inserted into the hole 100a with the countersink. In the operation of inserting, since the first elastic member 8 is provided, it is possible to prevent from applying an excessive load to the fastener 25 after the fastener 25 is inserted. In addition, since the alignment unit 9 is provided, a position of the fastener 25 (a position of the chuck 25) is adjustable in a X-Y plane even when the fastener 25 is slightly misaligned with the hole 100a with the countersink.

Figure 14:
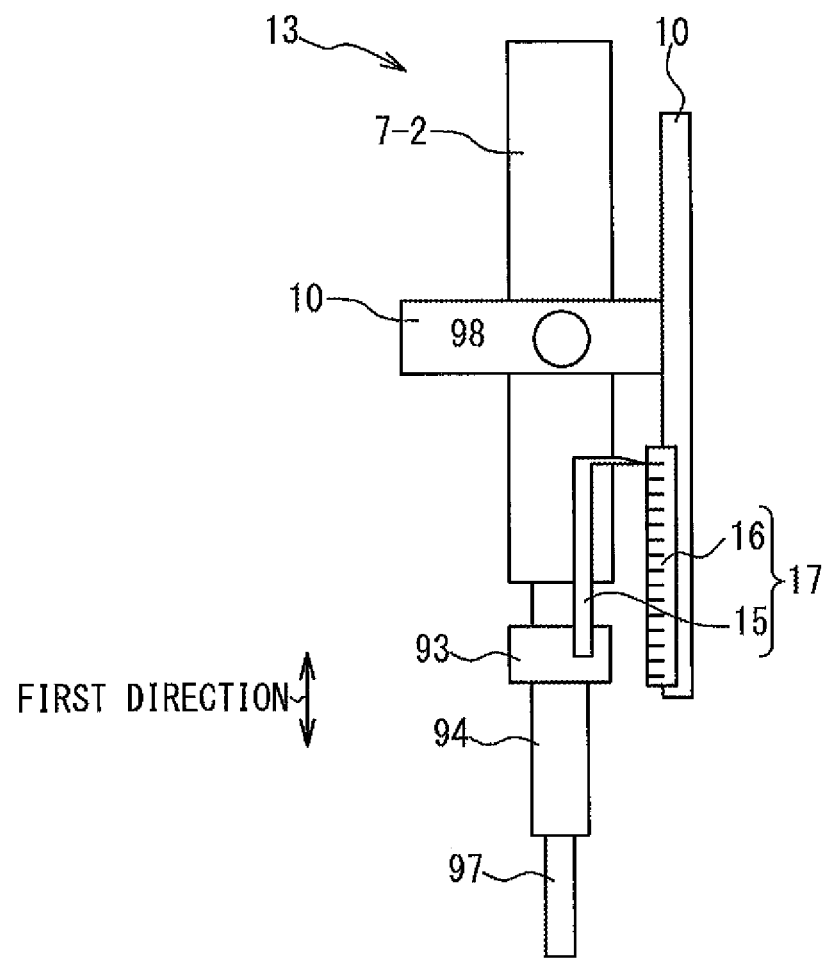
FIG. 14 is a side view for indicating the impact force applying mechanism.

Subsequently, referring to FIGS. 9 and 14, the impact force applying mechanism 13 will be explained. FIG. 14 is the side view for indicating the impact force applying mechanism 13. FIG. 14 is the diagram when the impact force applying mechanism 13 is viewed from the direction C indicated in FIG. 9.

As shown in FIGS. 9 and 14, the impact force applying mechanism 13 includes a feeding device 7-2, a head base 93, a snap base 94, a snap 97 and an stroke amount detecting mechanism 17.

The feeding device 7-2 is supported by the frame 10. The feeding device 7-2 is configured to reciprocate the head base 93 along the first direction. As the feeding device 7-2, for example, a cylinder device is used. The snap base 94 is a portion that holds the snap 97, and is connected to the head base 93. The snap 97 is a member that impinges on the fastener 25. That is, as the feeding device 7-2 reciprocates the head base 93, the snap 97 repeatedly impinges on the fasteners 25 and the impact force is applied to the fastener 25. As the feeding device 7-2, for example, an air hammer to drive the snap 97 using air or an electromagnetic hammer to drive the snap 97 electromagnetically can be used.

The stroke detecting mechanism 17 has a function of detecting the stroke amount of the feeding device 7-2. As shown in FIG. 14, the stroke amount detecting mechanism 17 has a scale 16 and a needle 15. The scale 16 is fixed to the frame 10. The needle 15 is attached to the head base 93. A position of the needle 15 with respect to the scale 16 is read by a reading device (not shown), and the position as a detected result of the stroke amount is transferred to the control unit 19. Alternatively, the stroke amount detecting mechanism 17 can be easily realized, for example, by using a ruler cylinder (a measuring cylinder) as the feeding device 7-2.

Figure 15:
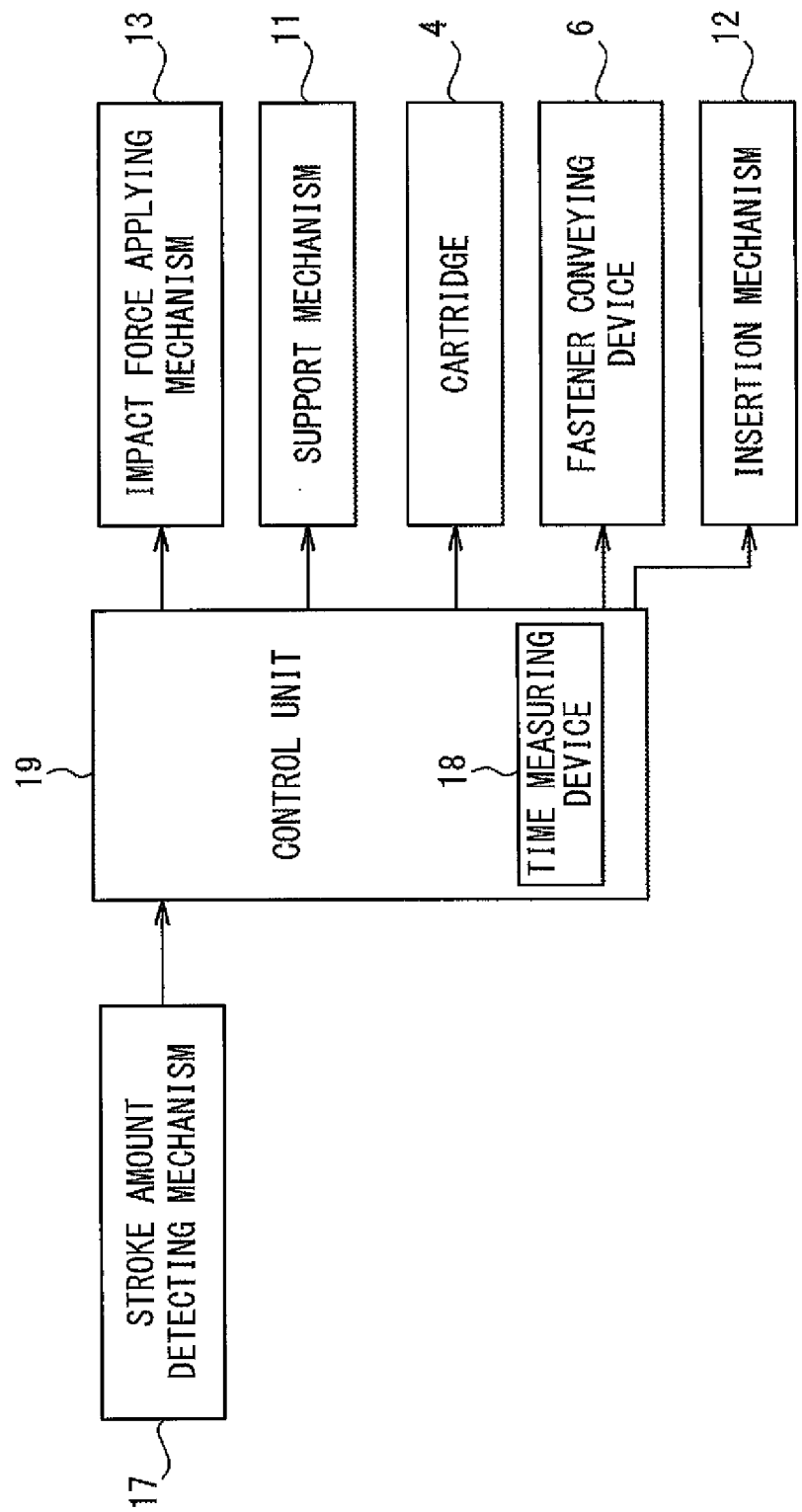
FIG. 15 is a schematic block diagram for indicating a control unit.

Subsequently, the control unit 19 will be explained. FIG. 15 is the schematic block diagram for indicating the control unit 19. As shown in FIG. 15, the control unit 19 has a function of controlling operations of the impact force applying mechanism 13, the support mechanism 11, the cartridge 4, the fastener conveying device 6 and the insertion mechanism 12.

The control unit 19 further includes a time measuring device 18. The control unit 19 measures an operation period (an impact force applying period during which the impact force is applied to the fastener 25) of the impact force applying mechanism 13 using the time measuring device 18. In addition, the control unit 19 obtains data indicating the stroke amount from the stroke amount detecting device 17 when the impact force is applied. Then, the control unit 19 has a function of determining whether or not to stop applying the impact force by the impact force applying mechanism 13 based on the detected stroke amount and the measured impact force applying period.

Subsequently, the operation method of the fastener applying apparatus will be explained. The operation method of the fastener applying apparatus explained below is realized by the control by the control unit 19.

Step S1: Loading the Fastener

Figure 16:
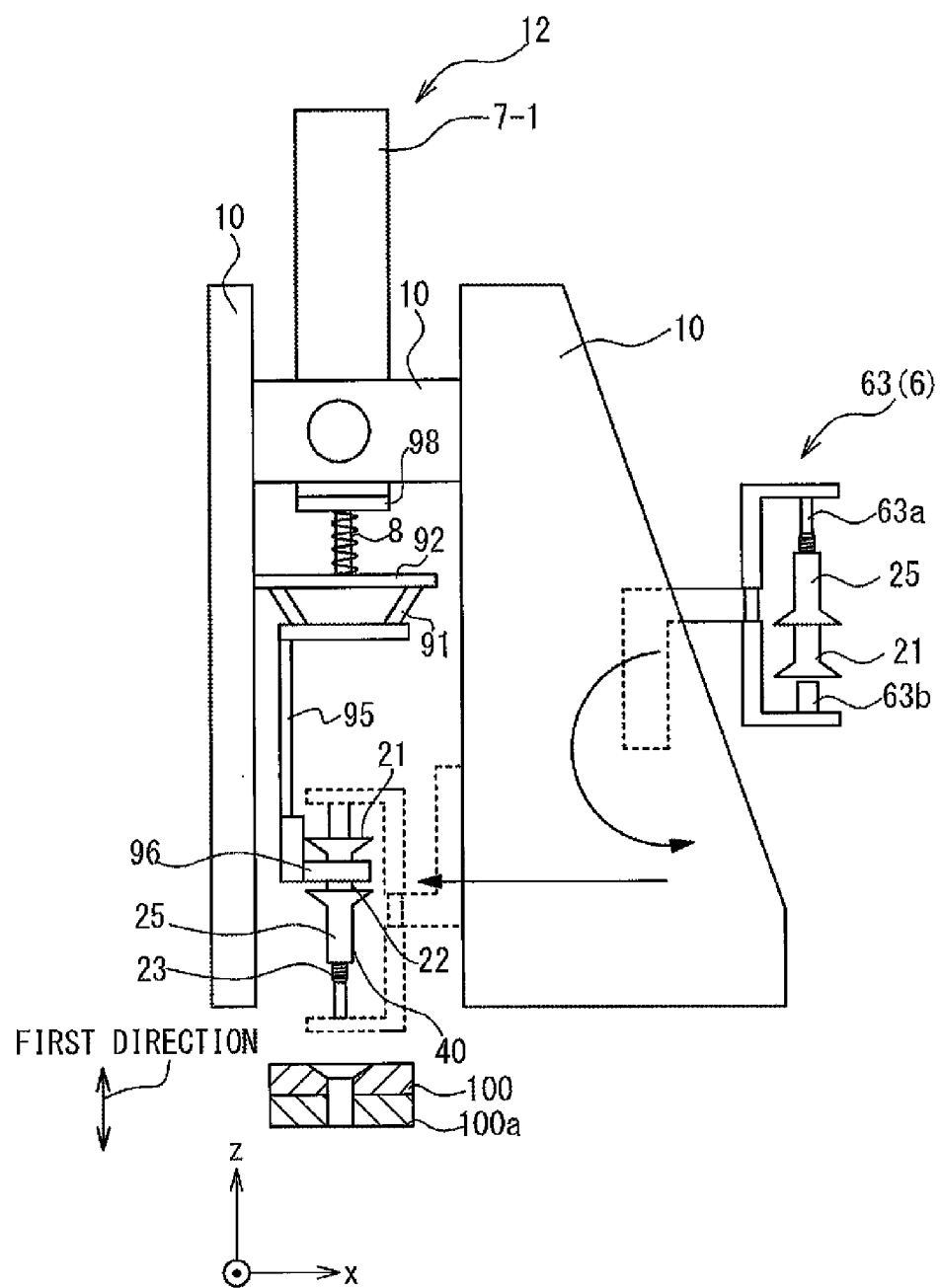
FIG. 16 is a schematic diagram for indicating an operation of loading the fastener.

Firstly, the fastener 25 is loaded into the insertion mechanism 12. FIG. 16 is the schematic diagram for indicating the operation of loading the fastener 25. As shown in FIG. 16, the gripping portion 63 of the fastener conveying device 6 grips the fastener 25 standing on the shelf plate 5. As shown in FIG. 10, on the shelf plate 5, the fastener 25 is placed over the notch 5*a*. Therefore, it is possible to grip the fastener 25 by the gripping portion 63 by moving the gripping portion 63 such that the fastener 25 is arranged between the first gripping portion 63*a* and the second gripping portion 63*b* and making the first gripping portion 63*a* and the second gripping portion 63*b* closer to each other. In this case, since the fastener 25 is disposed over the notch 5*a*, the gripping portion 63 does not interfere with the shelf plate 5. Furthermore, since the shelf plate 5 can rotate, the gripping portion 63 is capable of gripping the fastener 25, which is disposed over a different notch 5*a*, at the same position.

Then, the fastener conveying device 6 conveys the fastener 25 from the shelf plate 5 to the chuck 95. During the conveyance of the fastener 25, the main body portion 61 (see FIG. 8) moves toward the insertion mechanism 12, the lifting portion 62 (see FIG. 8) is raised or lowered to a height suitable for transferring the fastener 25 to the chuck 95, and the gripping portion 63 (see FIG. 8) turns such that the vertical relationship between the first gripping portion 63*a* and the second gripping portion 63*b* is reversed upside down. As a result of the turn of the gripping portion 63, the head portion 21 of the fastener 25 orients toward an upper side.

The insertion mechanism 12 holds the conveyed fastener 25 by changing a state of the holding portion 96 from an open state to a closed state. In this case, the holding portion 96 holds the shank portion of the fastener 25. Note that since the gripping portion 63 grips the fastener 25 in the axial direction of the fastener, the holding portion 96 can hold the shank portion of the fastener 25 at an arbitrary position. Therefore the holding portion 96 is capable of clamping a portion of the cylindrical portion 22 closer to the head portion 21 (a portion exposed from the sleeve 40). The holding portion 96 holds the fastener 25 in a state that the head portion 21 is on the upper side, namely the threaded portion 23 faces the workpiece 100. After the holding portion 96 holds the fasteners 25, the gripping portion 63 releases the fasteners 25.

Figure 1:
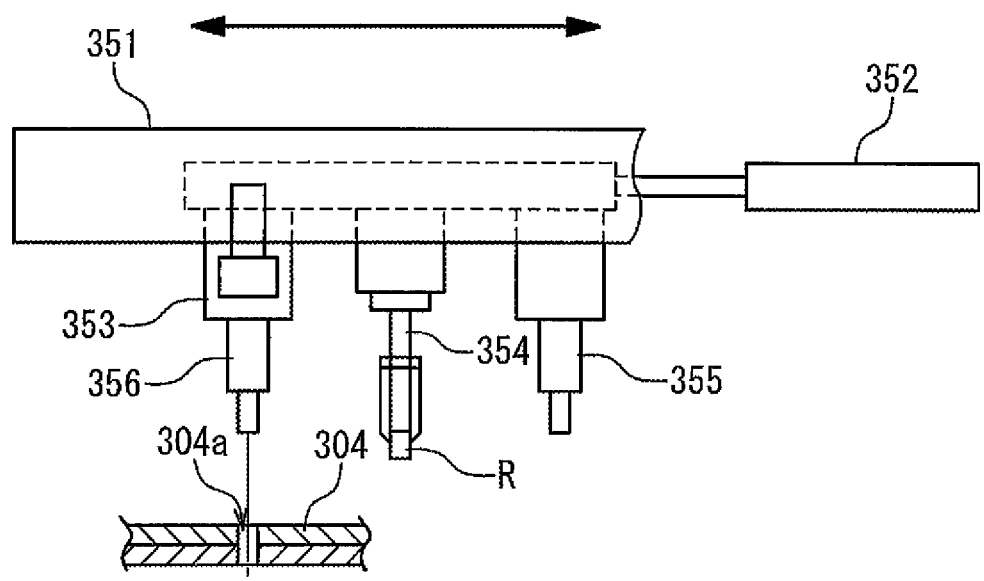
FIG. 1 is a diagram for indicating the upper head portion.
Figure 2:
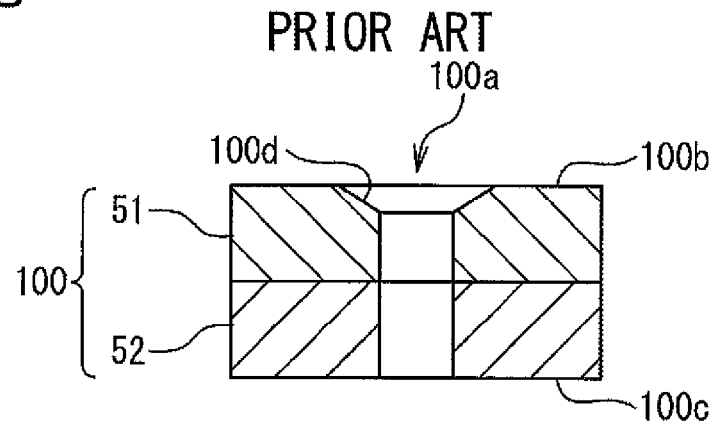
FIG. 2 is a diagram for indicating the method of manually fastening the composite material component to be fastened.
Figure 3:
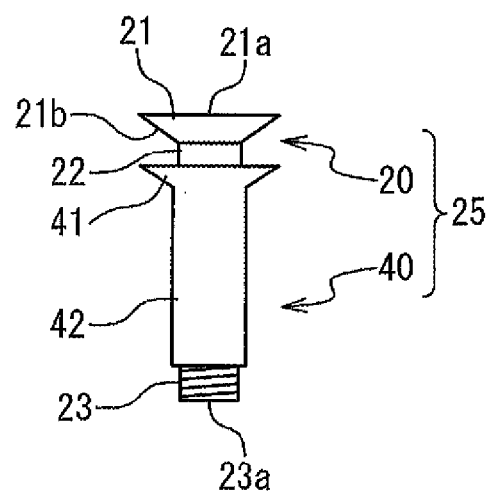
FIG. 3 is a diagram for indicating the method of manually fastening the composite material component to be fastened.
Figure 4:
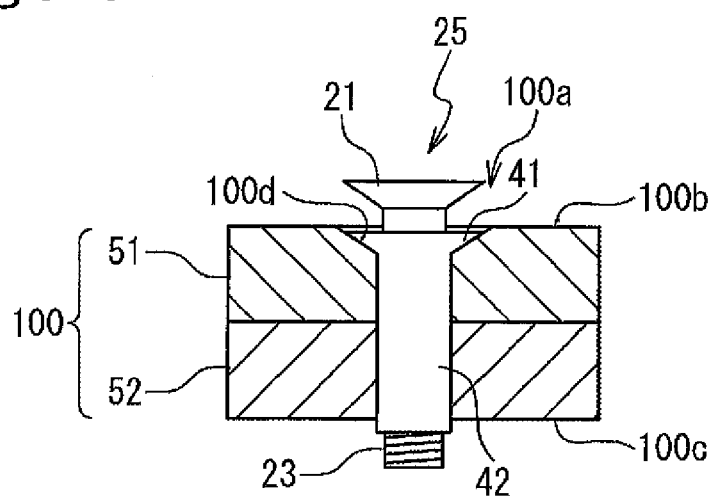
FIG. 4 is a diagram for indicating the method of manually fastening the composite material component to be fastened.
Figure 5:
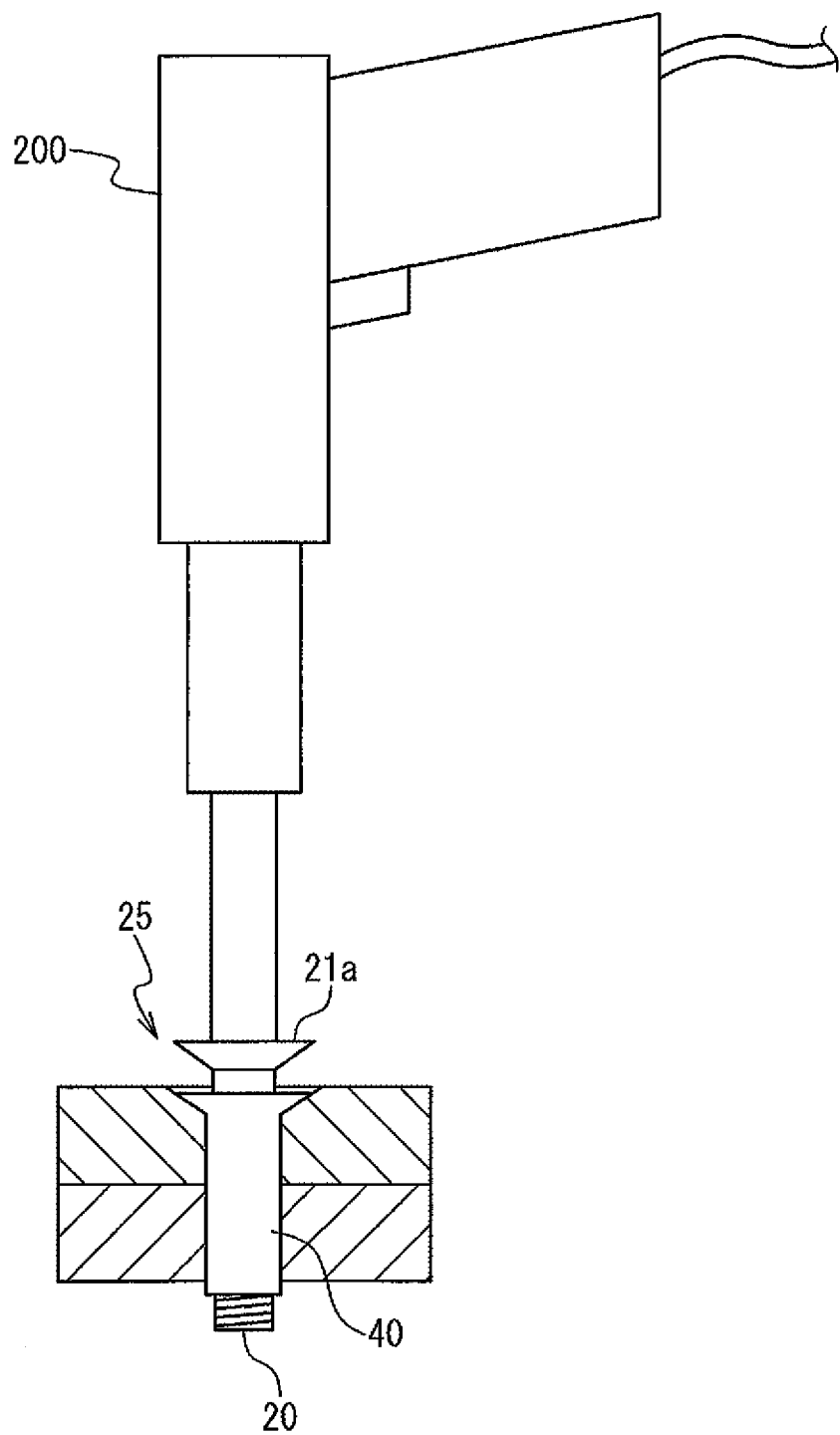
FIG. 5 is a diagram for indicating the method of manually fastening the composite material component to be fastened.
Figure 6:
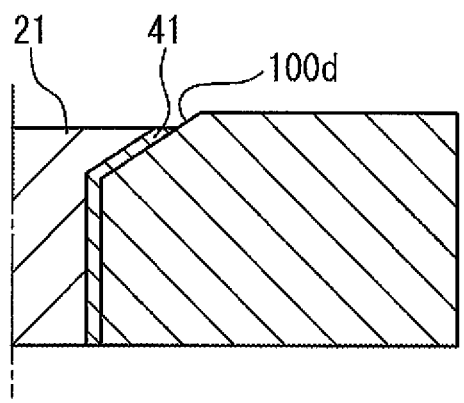
FIG. 6 is a diagram for indicating the method of manually fastening the composite material component to be fastened.
Figure 7:
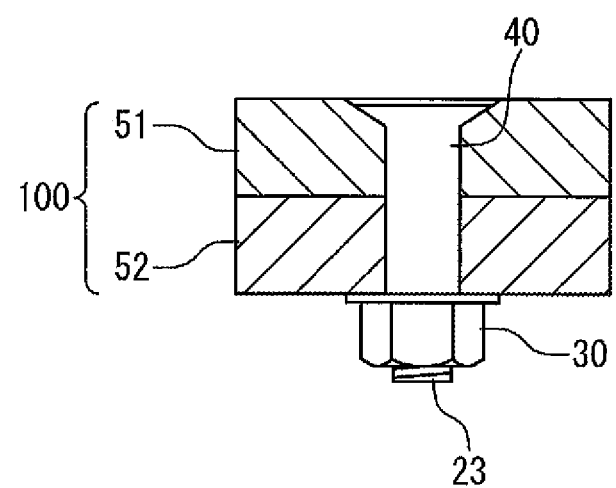
FIG. 7 is a diagram for indicating the method of manually fastening the composite material component to be fastened.

Note that in the case that sealant material is applied to the head side surface 21*b* (see FIG. 3) and the sleeve 40, ideas of disposing the fastener 25 on the shelf plate 5 in the standing attitude, gripping the fastener 25 in the axial direction by the gripping portion 63 of the fastener conveying device 6 and clamping the portion of the cylindrical portion 22 closer to the head portion 21 (the portion exposed from the sleeve 40) by the holding portion 96 are especially advantageous.

Step S2: Inserting the Fastener

Figure 17:
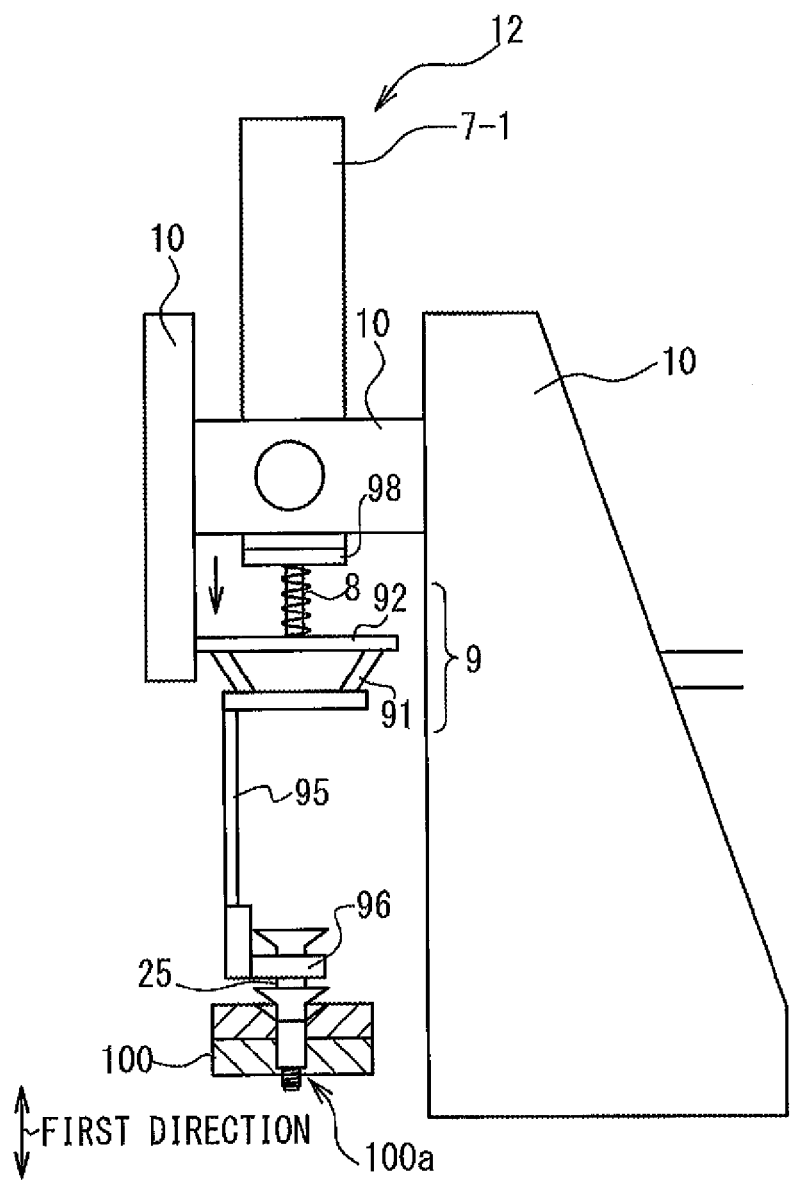
FIG. 17 is a schematic diagram for indicating an operation of inserting the fastener.

Subsequently, the insertion mechanism 12 inserts the loaded fastener 25 into the hole 100*a* with the countersink. FIG. 17 is the schematic diagram for indicating the operation of inserting the fastener 25.

As shown in FIG. 17, the feeding device 7-1 of the insertion mechanism 12 lowers the base portion 98. That is, the insertion mechanism 12 moves the base portion 98 along the first direction. Thereby, the chuck 95 is lowered, and the fastener 25 is inserted into the hole 100*a* with the countersink.

Note that there may be a case in which the position of the fastener 25 is misaligned with respect to the hole 100*a* with the countersink before insertion. Even in such a case, since the alignment unit 9 is provided, it is possible to correct the position of the fastener 25 and an angle with respect to the workpiece 100 and it is possible to insert the fastener 25 in the correct attitude.

In addition, the first, elastic member 8 is arranged between the feeding device 7-1 and the chuck 95. Therefore, it is possible to prevent from applying the excessive load to the fastener 25 and the workpiece 100 after the insertion of the fastener 25.

Step S3: Movement

The holding portion 96 releases the fastener 25 after the insertion of the fastener 25. Then, the base 3 (see FIG. 8) moves on the vacuum rail 2 such that the impact force applying mechanism 13 is above the fastener 25. That is, the impact force applying mechanism 13 is moved along the second direction.

Step S4: Driving the Fastener

Figure 18:
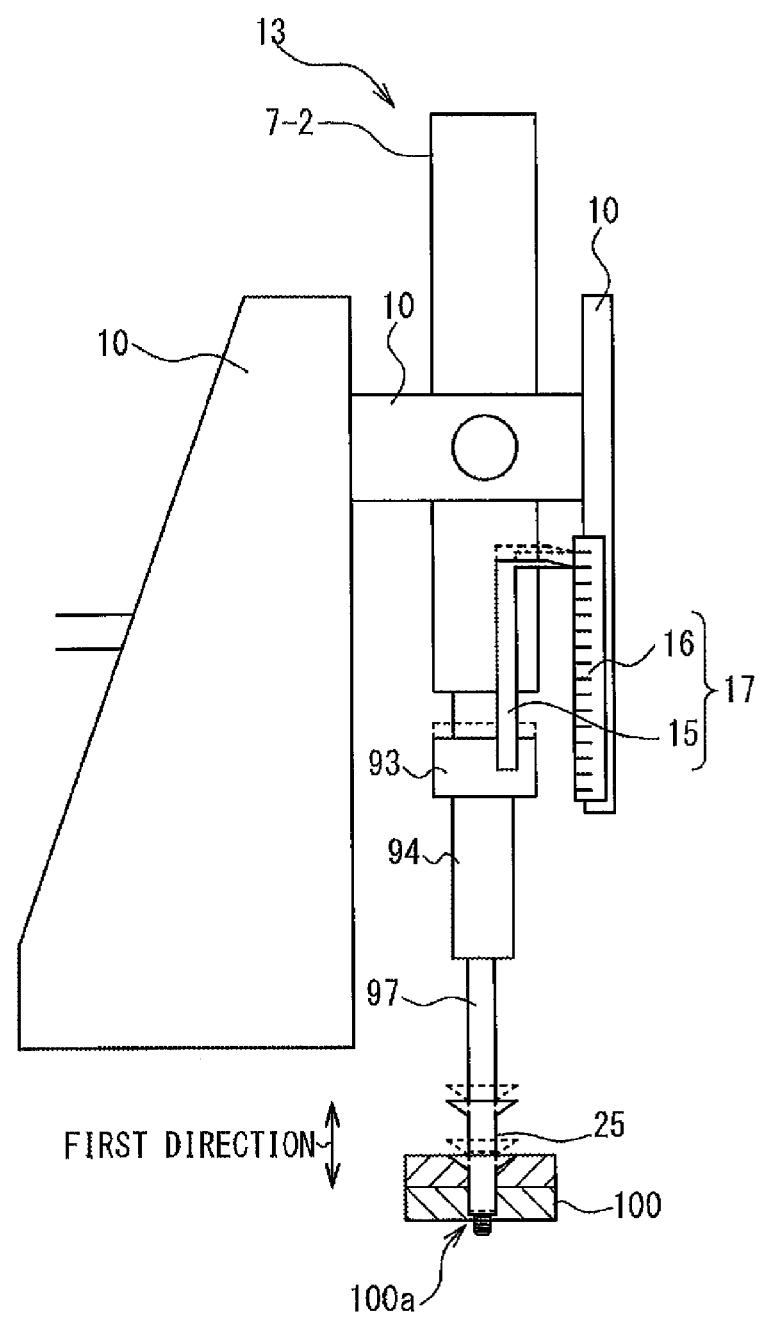
FIG. 18 is a schematic diagram for indicating an operation of driving the fastener.

Next, the inserted fastener 25 is driven by the impact force applying mechanism 13. FIG. 18 is the schematic diagram for indicating the operation of driving the fastener 25. As shown in FIG. 18, the feeding device 7-2 reciprocates the head base 93 along the first direction. Thereby, the snap 97 repeatedly strikes the fastener 25, and the impact force is applied repeatedly to the fastener 25. As a result, the fastener 25 is driven.

Figure 19:
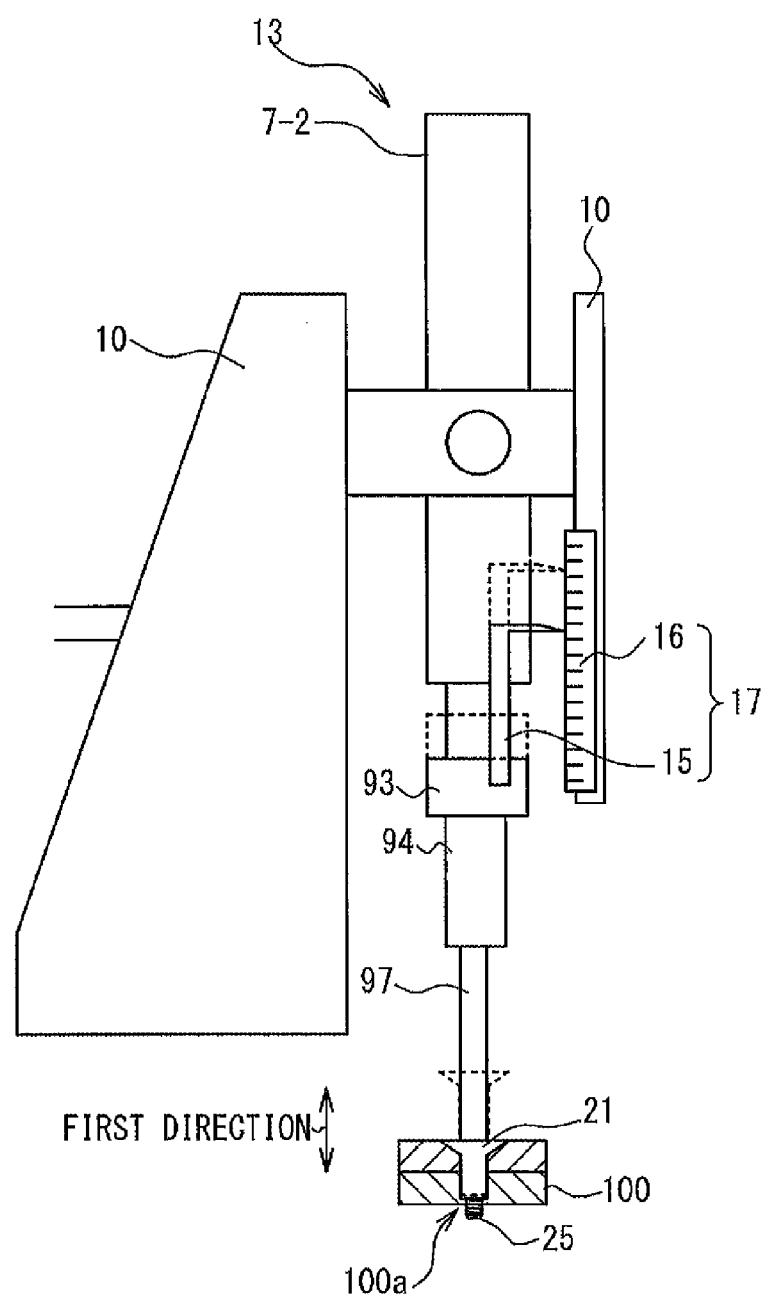
FIG. 19 is a schematic diagram for indicating the fastener after the driving operation.

FIG. 19 is the schematic diagram for indicating the fastener 25 after the driving operation. As shown in FIG. 19, the impact force applying mechanism 13 repeatedly applies the impact force until the fastener 25 is seated (until the head portion 21 of the fastener 25 fits to the hole 100*a* with the countersink).

Note that it is desirable that the application of the impact force is stopped at the right timing. If the number of applying the impact force is too small, there exists a case in which the driving amount of the fastener 25 is insufficient. On the other hand, if the number of applying the impact force is too large, the excessive load may be applied to the fastener 25 and the workpiece 100.

Therefore, each time the impact force is applied to the fastener 25, the data indicating a moving amount of the head base 93 (indicating the stroke amount of the feeding device 7-2) is notified from the stroke amount detecting mechanism 17 to the control unit 19. The control unit 19 determines whether or not to stop applying the impact force based on the stroke amount. For example, the control unit 19 compares the obtained stroke amount with a predetermined set value, and judges that the fastener is seated when the obtained stroke amount exceeds the predetermined set value, and then stops applying the impact force.

In addition, the control unit 19 starts up the time measuring device 18 (see FIG. 15) when the application of the impact force by the impact force applying mechanism 13 starts. Then, the control unit 19 obtains data indicating the impact force applying period from the time measuring device 18, and determines whether or not to stop applying the impact force based on the impact force applying period. For example, the control unit 19 compares the impact force applying period with a predetermined set value, and judges that the fastener is seated when the impact force applying period exceeds the predetermined set value, and then stops applying the impact force.

Note that the control unit 19 may determine whether or not to stop applying the impact force based on both the stroke amount and the impact force applying period. Alternatively, the control unit 19 may determine whether or not to stop applying the impact force based on only one of the stroke amount or the impact force applying period.

Step S5: Loading and Inserting Next Fastener

In parallel with the operation in Step S4, the next fastener 25 is loaded from the cartridge 4 into the insertion mechanism 12 and inserted into next hole 100*a* with the countersink. Since the operation in this Step S5 is similar with the operation in steps S1 and S2, detailed explanation thereof is omitted.

By above mentioned operation method, the fasteners 25 are inserted into holes 100*a* with the countersinks, and are driven. After that, fastening operation is performed, nuts etc. are attached to the fasteners 25, and the workpiece 100 is fastened.

According to the present embodiment, the insertion mechanism 12 and the impact force applying mechanism 13 are supported along the different axes, respectively by the support mechanism 11. Therefore, it is possible to support the insertion mechanism 12 and the impact force applying mechanism 13 stably. Thereby, it is possible to reduce the size of each feeding device (7-1, 7-2) installed on the insertion mechanism 12 or the impact force applying mechanism 13, it is possible to reduce the whole size of the fastener applying apparatus 1, and it is possible to reduce the weight of the fastener applying apparatus 1.

In addition, according to the present embodiment, since the insertion mechanism 12 and the impact force applying mechanism 13 are disposed along the axes separately arranged, it is possible to perform the loading operation and inserting operation for the next fastener 25 in parallel with the driving operation (Step S4) for the fastener 25 using the impact force driving mechanism 13. Thereby, it is possible to reduce the operation time.

Moreover, according to the present embodiment, the decision whether or not to stop applying the impact force is made based on the stroke amount or the impact force applying period. Thereby, it is possible to properly detect the seating of the fastener, and prevent the excessive driving and the insufficient driving.

Second Embodiment

Figure 20:
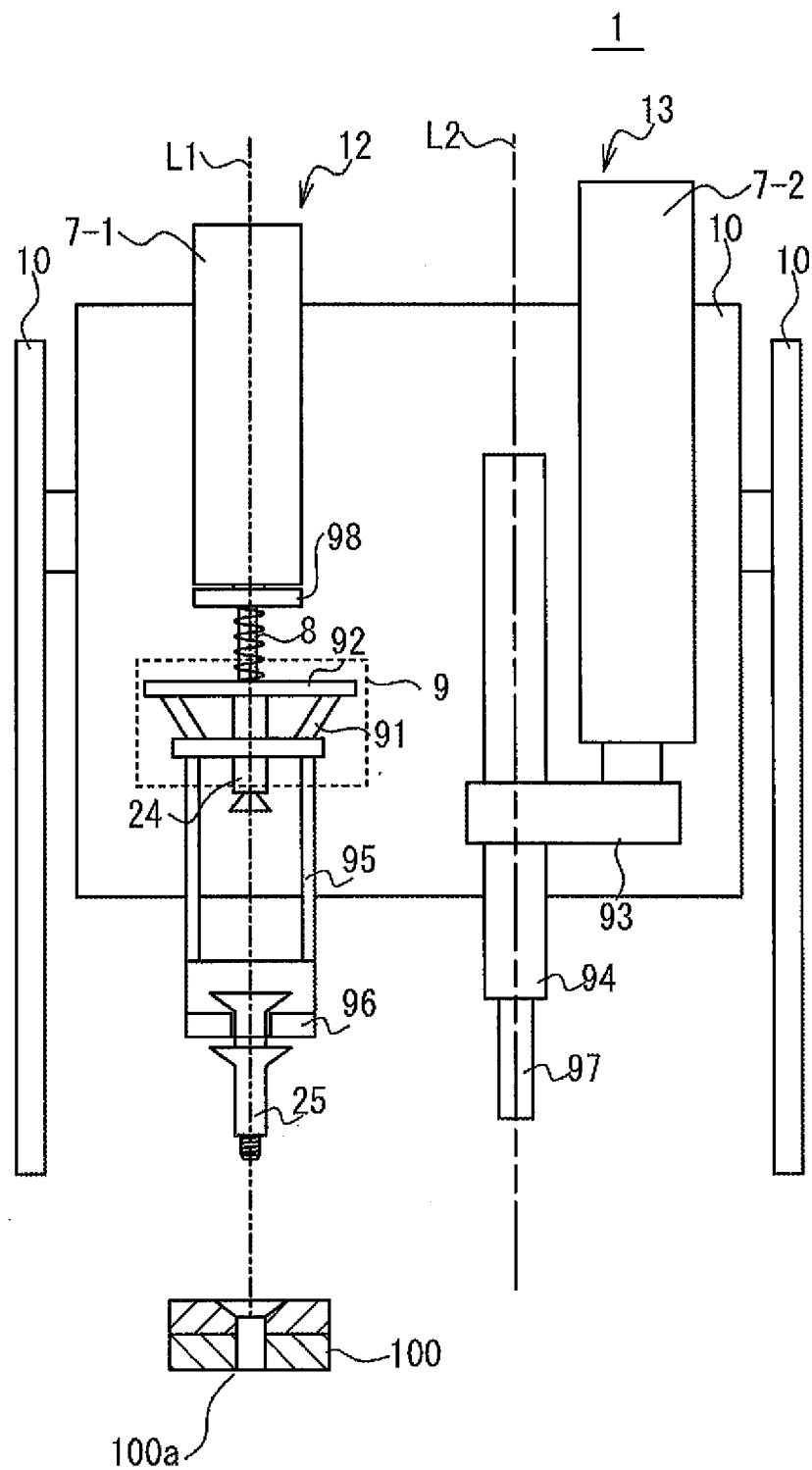
FIG. 20 is a schematic diagram for indicating the fastener applying apparatus according to the second embodiment.

Next, the second embodiment will be explained. FIG. 20 is the schematic diagram for indicating the fastener applying apparatus 1 according to the present embodiment. According to the present embodiment, the fastener applying apparatus 1 includes an imaging device 24. Since other points excluding the imaging device are the same as those of the first embodiment, detailed explanation thereof will be omitted.

As shown in FIG. 20, the imaging device 24 is attached to the insertion mechanism 12 such that the imaging device 24 is along the insertion axis L1. More specifically, the imaging device 24 is disposed inside the plurality of second elastic members 91 of the alignment unit 9, and is supported by the movable body 92.

According to the present embodiment, the control unit 19 images the workpiece 100 using the imaging device 24 and identifies a location of the hole 100*a* with the countersink. The control unit 19 moves the base 3 (see FIG. 8) based on the identification result such that the fastener 25 held by the holding portion 96 is located right above the hole 100*a* with the countersink. Thereby, it is possible to accurately move the fastener 25 into the hole 100*a* with the countersink.

Furthermore, according to the embodiment, the imaging device 24 is attached to the insertion mechanism 12. It is not necessary to provide additional shank member etc. to support the imaging device 24, and it is possible to reduce the weight of the fastener applying apparatus 1 and reduce the size of the fastener applying apparatus. In particular, according to the present embodiment, the imaging device 24 is disposed so as to be surrounded by the plurality of the second elastic members 91. Therefore, in spite of adding the imaging device 24, substantially no increase in size is necessary.

Although the present invention has been described with reference to the first and second embodiments, these embodiments are not necessary to be independent to each other. It is also possible to combine these embodiments as long as the technical contradiction does not occur.

It should be noted that this application claims a priority based on Japan Patent Application No. JP 2012-242235, and the disclosure thereof is incorporated herein by reference.

The invention claimed is:

1. A fastener applying apparatus comprising:
    an insertion mechanism configured to insert a fastener into a fastener hole in an object to be fastened;
    a support mechanism configured to support the insertion mechanism;
    an imaging device configured to image the fastener hole and supported by the support mechanism such that the imaging device and the insertion mechanism are disposed on a same axis;
    a fastener conveying device configured to convey the fastener to the insertion mechanism; and
    a control unit,
    wherein the insertion mechanism includes
        a holding portion configured to hold a shank portion of the fastener,
        a feeding device movably supported by the support mechanism so as to be movable along a first direction,
        a fastener support member configured to support the fastener and supported by the feeding device, and
        an alignment unit comprising a plurality of first elastic members arranged along a plane between the feeding device and the fastener support member, configured to support the fastener support member such that the fastener support member is movable along a first plane perpendicular to the first direction, the imaging device is surrounded by the plurality of first elastic members,
    the fastener conveying device includes a gripping portion configured to grip the fastener in an axial direction of the fastener, and
    the control unit controls the insertion mechanism and the fastener conveying device such that the gripping portion releases the fastener after the holding portion holds the fastener.

2. The fastener applying apparatus according to claim 1, wherein the insertion mechanism further comprises a second elastic member supported by the feeding device and configured to support the fastener support member,
    wherein the second elastic member is supported such that the fastener support member is elastically movable with respect to the feeding device.

3. The fastener applying apparatus according to claim 1, wherein the gripping portion comprises:

a first gripping portion configured to come in contact with a first end of the fastener; and a second gripping portion configured to come in contact with a second end of the fastener, wherein the gripping portion is turnable such that a vertical relationship between the first gripping portion and the second gripping portion can be reversed upside down.

4. The fastener applying apparatus according to claim 1, further comprising:

a shelf plate having a plurality of notches and configured to store a plurality of the fasteners over the plurality of notches, respectively.

5. The fastener applying apparatus according to claim 1, further comprising:

an impact force applying mechanism supported by the support mechanism and configured to apply impact force to the inserted fastener, wherein the insertion mechanism is configured to insert the fastener by moving the fastener along an insertion axis parallel to the first direction, wherein the impact force applying mechanism is configured to move along a driving axis parallel to the first direction and impinge on the inserted fastener so as to apply the impact force, wherein the support mechanism includes a moving mechanism configured to move the insertion mechanism and the impact force applying mechanism along a second direction perpendicular to the first direction.

6. The fastener applying apparatus according to claim 5, wherein the control unit is configured to determine whether or not to stop applying the impact force by the impact force applying mechanism.

7. The fastener applying apparatus according to claim 6, wherein the impact force applying mechanism comprises a stroke amount detecting mechanism configured to detect a stroke amount when the impact force is applied to the inserted fastener, wherein the control unit is configured to determine whether or not to stop applying the impact force based on the detected stroke amount.

8. The fastener applying apparatus according to claim 6, further comprising:

a time measuring device configured to measure an impact force applying period during which the impact force is applied by the impact force applying mechanism, wherein the control unit is configured to determine whether or not to stop applying the impact force based on the measured results by the time measuring device.

* * * * *